United States Patent
Van Hook et al.

(10) Patent No.: US 7,242,400 B2
(45) Date of Patent: Jul. 10, 2007

(54) COMPRESSION AND DECOMPRESSION OF DATA USING PLANE EQUATIONS

(75) Inventors: Timothy Van Hook, Atherton, CA (US); Farhad Fouladi, Los Altos Hills, CA (US)

(73) Assignee: ATI Technologies ULC, Markham, Ontario (CA)

( * ) Notice: Subject to any disclaimer, the term of this patent is extended or adjusted under 35 U.S.C. 154(b) by 465 days.

(21) Appl. No.: 10/293,003

(22) Filed: Nov. 13, 2002

(65) Prior Publication Data

US 2004/0091160 A1  May 13, 2004

(51) Int. Cl.
*G06T 1/00* (2006.01)
(52) U.S. Cl. .......................... 345/418; 382/232
(58) Field of Classification Search ................ 345/419
See application file for complete search history.

(56) References Cited

U.S. PATENT DOCUMENTS

| | | | | |
|---|---|---|---|---|
| 5,613,048 A * | 3/1997 | Chen et al. | ................ | 345/419 |
| 5,990,904 A * | 11/1999 | Griffin | ................ | 345/631 |
| 6,104,837 A * | 8/2000 | Walker | ................ | 382/239 |
| 6,407,741 B1 * | 6/2002 | Morein et al. | ................ | 345/555 |
| 6,476,811 B1 * | 11/2002 | DeRoo et al. | ................ | 345/427 |
| 6,492,991 B1 * | 12/2002 | Morein et al. | ................ | 345/555 |
| 6,630,933 B1 * | 10/2003 | Van Hook | ................ | 345/422 |
| 2002/0118202 A1 * | 8/2002 | Baldwin | ................ | 345/530 |
| 2002/0130863 A1 * | 9/2002 | Baldwin | ................ | 345/420 |
| 2003/0164823 A1 * | 9/2003 | Baldwin et al. | ................ | 345/419 |

OTHER PUBLICATIONS

Shade et al. Layered Depth Images. Proceedings of the 25th Annual Conference on Computer Graphics and Interactive Techniques. ACM Press. 1998.*

* cited by examiner

*Primary Examiner*—Ulka Chauhan
*Assistant Examiner*—Peter-Anthony Pappas
(74) *Attorney, Agent, or Firm*—Vedder, Price, Kaufman & Kammholz, P.C.

(57) ABSTRACT

The present invention provides a scheme for compressing and decompressing the depth, or Z, components of image data. Image data is grouped into a plurality of tiles. A test is performed to determine if a tile can be compressed so that its size after compression is less than its size before compression. If so, the tile is compressed. A tile table includes a flag that can be set for each tile that is compressed. In one scheme, each tile comprises a 4×4 block of pixels. For each pixel, the visible depth complexity is determined where each visible level of depth complexity is represented by a plane equation. Depending on the depth complexity, a compression scheme is chosen that stores multiple plane equations in cache lines. The compression scheme can be used with unsampled or multisampled data and provides higher levels of compression in multisampled environments.

24 Claims, 8 Drawing Sheets

TFT=01

COMPRESSION AND DECOMPRESSION OF DATA USING PLANE EQUATIONS

BACKGROUND OF THE INVENTION

1. Field of the Invention

This invention relates to the field of image data compression.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background

Three dimensional graphics processing applications require the storage and processing of large amounts of data. The time it takes to transfer data from memory to a graphics processor can negatively affect the ability to process graphics data. There is a need to improve the ability to quickly transfer graphics data from memory to processor. This problem can be understood by reviewing the way that graphics systems process data.

Computer systems are often used to display generate and display graphics on a display. Display images are made up of thousands of tiny dots, where each dot is one of thousands or millions of colors. These dots are known as picture elements, or "pixels". Each pixel has a color, with the color of each pixel being represented by a number value stored in the computer system.

A three dimensional display image, although displayed using a two dimensional array of pixels, may in fact be created by rendering of a plurality of graphical objects. Examples of graphical objects include points, lines, polygons, and three dimensional solid objects. Points, lines, and polygons represent rendering "primitives" which are the basis for most rendering instructions. More complex structures, such as three dimensional objects, are formed from a combination or mesh of such primitives. To display a particular scene, the visible primitives associated with the scene are drawn individually by determining those pixels that fall within the edges of the primitive, and obtaining the attributes of the primitive that correspond to each of those pixels. The obtained attributes are used to determine the displayed color values of applicable pixels.

Sometimes, a three dimensional display image is formed from overlapping primitives or surfaces. A blending function based on an opacity value associated with each pixel of each primitive is used to blend the colors of overlapping surfaces or layers when the top surface is not completely opaque. The final displayed color of an individual pixel may thus be a blend of colors from multiple surfaces or layers.

In some cases, graphical data is rendered by executing instructions from an application that is drawing data to a display. During image rendering, three dimensional data is processed into a two dimensional image suitable for display. The three dimensional image data represents attributes such as color, opacity, texture, depth, and perspective information. The draw commands from a program drawing to the display may include, for example, X and Y coordinates for the vertices of the primitive, as well as some attribute parameters for the primitive (color and depth or "Z" data), and a drawing command. The execution of drawing commands to generate a display image is known as graphics processing.

A limitation of system performance is the bandwidth required to transfer data from memory to the graphics processor.

SUMMARY OF THE INVENTION

The present invention provides a scheme for compressing and decompressing the depth, or Z, components of image data. Image data is grouped into a plurality of tiles. A test is performed to determine if a tile can be compressed so that its size after compression is less than its size before compression. If so, the tile is compressed. A tile table includes a flag that can be set for each tile that is compressed. In a data transfer from memory to a graphics processor, the tile table is examined to identify those tiles that are compressed and must be decompressed prior to use.

In one scheme, each tile comprises a 4×4 block of pixels. For each pixel in the tile, the Z data is examined to determine the depth complexity. For instance, if there are seven overlapping primitives covering a tile, then the visible depth complexity might be seven. Variable compression is applied to the tiles based on the depth complexity of the Z data. If the depth complexity is relatively low, the data is highly compressed. As the depth complexity increases, the level of compression decreases, until a maximum depth complexity where there is effectively no compression applied to the tiles.

In one embodiment, each level of depth complexity in a tile is configured to be stored as a plane equation. If a tile has a depth complexity level of one, a single plane equation is used. For lower levels of depth complexity, a single cache line might be used to store multiple plane equations. As the depth complexity level increases, more cache lines are required for the plane equations and hence, the level of compression decreases.

If a tile is of maximum depth complexity, compression is not used.

DETAILED DESCRIPTION OF THE INVENTION

Compression and decompression of Z data using a variable compression mode is described. In the following description, numerous specific details are set forth in order to provide a more thorough description of the invention. It will be apparent, however, to one skilled in the art, that the present invention may be practiced without these specific details. In other instances, well known details have not been provided so as to not unnecessarily obscure the invention.

The present invention provides for a compression scheme to reduce the amount of data that needs to be stored in memory. The compressed data can be transferred from memory to processor at a higher bandwidth than uncompressed data, improving performance. The invention also provides for a method of decompressing the data at the processor. The compression scheme of the invention is a lossless scheme so that no image information is lost. The invention operates under the constraints that the compressed image data is less than or equal to the image data uncompressed, and that the bandwidth of transferring the compressed image data is less than or equal to the bandwidth of the uncompressed image data.

Data Organization

The invention organizes color images in 2 dimensional groups of pixels referred to as tiles. In one embodiment, the tiles are 4 pixels by 4 pixels. Each tile, when used by a computing system is placed in a cache, where it is temporarily stored until used. A cache is a dedicated piece of hardware that is designed for fast access to data that is likely to be used by a computing system at some time in the near future. In one embodiment, each cache line is 32 bytes. The cache is configured to store compressed data, for instance one or more plane equations, for each tile. Other configurations for the tiles and the cache may be used without departing from the scope and spirit of the present invention.

The computer system may employ a computer program product tat includes computer usable medium having computer readable program code embodied therein wherein the computer readable code is configured to cause a device to carry out operations described herein. By way of example, a computer usable medium having computer readable program code embodied therein configured for compressing data in a graphics processing system includes computer readable code configured to cause a computer to obtain a data tile, computer readable code configured to cause a computer to determine a visible depth complexity of said tile, wherein each level of depth complexity is represented by a plane equation and multiple plane equations are stored in a cache line, computer readable code configured to cause a computer to select a compression scheme based on said depth complexity, wherein said selected compression scheme includes one of a high compression scheme and a low compression scheme and wherein up to three plane equations are stored in a single cache line in said high compression scheme. Also, up to four plane equations may be stored in two cache lines in the low compression scheme. Computer readable code is stored that causes a computer to store said tile using said selected compression scheme. Also, cache lines include a matrix identifying which plane equation is associated with each pixel of said file.

Depth Complexity

Each tile may have graphical data from a number of primitives that intersect in the tile. The surfaces of some of these primitives may be visible and some may be hidden, depending on their relationship to each other. The number of surfaces that are visible in a tile represents the visible depth complexity of the tile. For example, if eight surfaces are visible, the visible depth complexity of the tile is eight.

Plane Equations

A planar three dimensional surface (also referred to as a "primitive" or a "triangle") can be defined by a plane equation. A plane equation allows the Z value at any point of a triangle or primitive to be defined by 3 values. One is the depth Z0 at the center of a 4×4 tile. The other values are dzx (change in Z value in the x direction) and dzy (change in value in the y direction). Thus, $Z=Z0+dxdzx+dydzy.$ In one embodiment, each plane equation is defined using 65 bits. Five bits are used for a common exponent, 17 bits are used as the mantissa for dzx and another 17 bits are used as the mantissa for dzy. 25 bits are used for Z0 and one bit is a stencil bit.

Tile Compression

Figure 1:
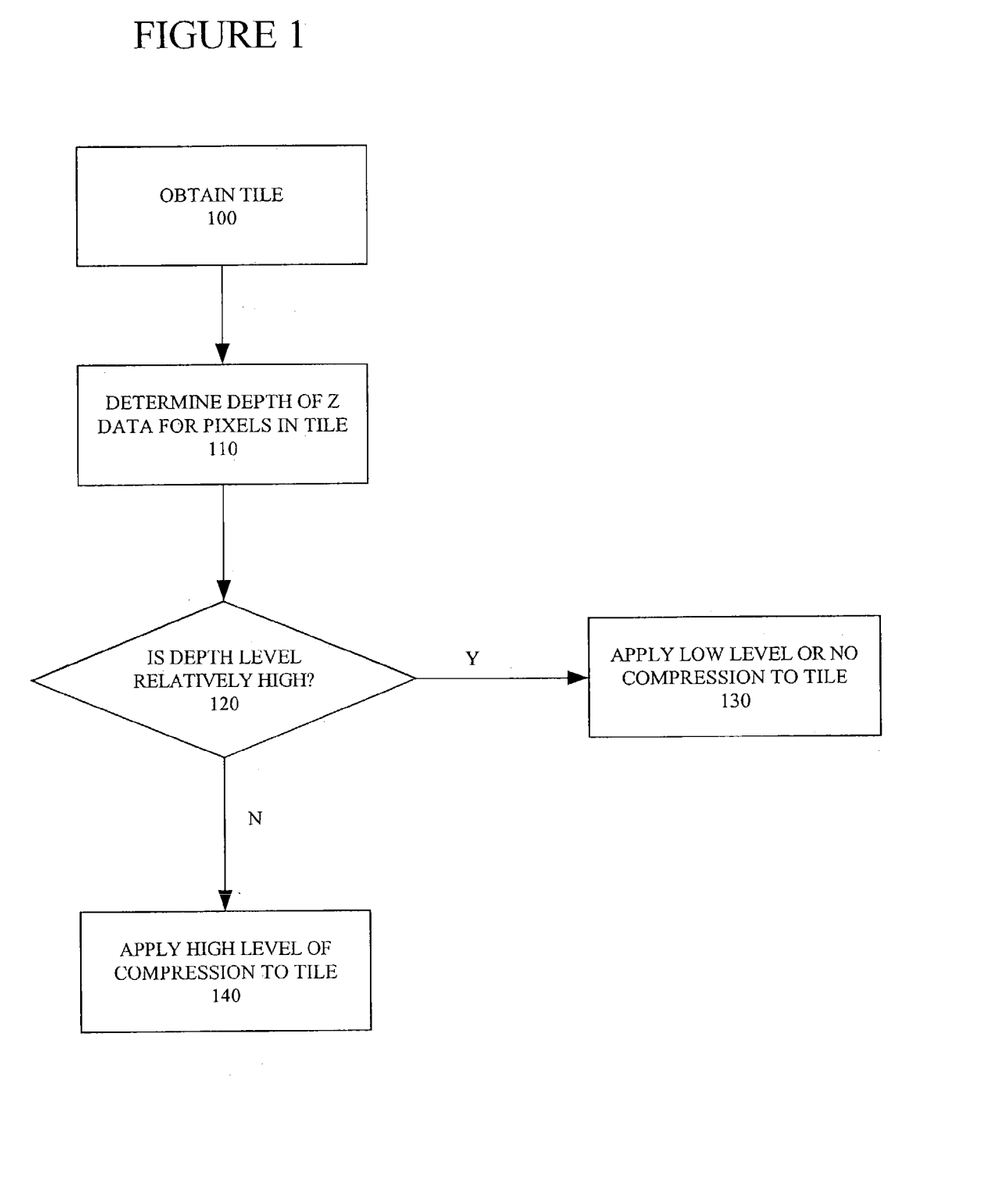
FIG. 1 shows Z compression according to an embodiment of the present invention.

One embodiment of the present invention is shown in FIG. 1. At step 100, a tile is obtained. At step 110, the depth complexity of the tile is determined. At step 120, it is determined whether the depth complexity is relatively high. If it is, then at step 130 a low level or no compression is applied to the Z data. If, on the other hand, the depth complexity is relatively low, then a high level of compression is applied at step 140.

Figure 2:
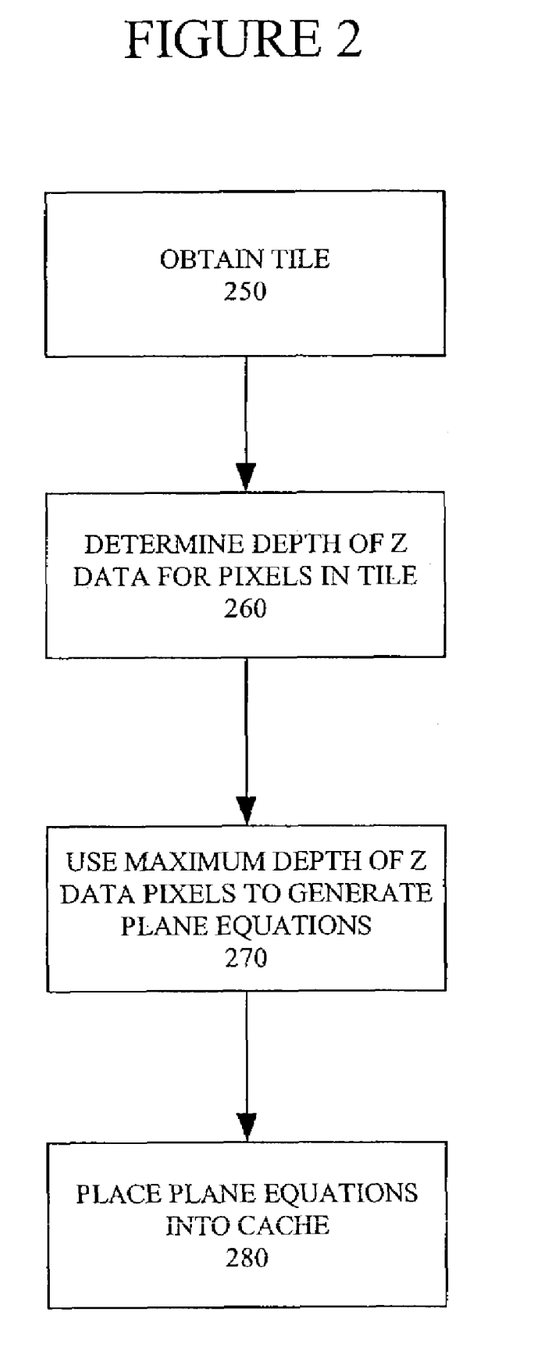
FIG. 2 shows Z compression according to another embodiment of the present invention.

Another embodiment of the present invention is shown in FIG. 2. At step 250, a tile is obtained. The tile may be a 4×4 grouping of pixels, or it may be another suitable configuration. At step 260, the depth complexity of the tile is determined. At step 270, the depth complexity (and sample rate in a multisampling environment) is used to determine the number of plane equations required to store the tile. At step 280, the tile is stored using the fewest cache lines needed to store the required number of plane equations.

The present invention considers each tile to be written to memory as a candidate for compression. The invention determines whether the compression of the tile would save memory or not and processes the tile accordingly. As a result, each individual tile could be compressed or uncompressed. For instance, in variable compression mode, a determination is made as to the depth complexity of a given tile. If the depth complexity is maximal, then the number of plane equations required to represent the tile is maximal, so compression does not result in saving space when representing the tile in the cache. On the other hand, if the depth complexity is minimal, very little information is needed to represent the tile, so a minimal number of plane equations need to be used to represent the tile. This results in relatively few plane equations that occupy relatively little cache space.

Variable Compression Mode

The present invention presumes that Z data is stored in cache lines in a Zbuffer memory. Each tile in the Zbuffer memory can be read out or written as pixels, or in any one of a number of compressed formats (requiring fewer memory words to be accessed). The compression scheme of the present invention in one embodiment does not reduce the size of the Zbuffer, only the number of cache lines used per Z tile. Compressed tiles reduce Z memory bandwidth in order to make more bandwidth available for other accesses, such as color and display, and thereby increase system throughput.

In accordance with one embodiment of the present invention, compression is performed on a 4×4 block of pixels (i.e., a tile). In one embodiment of the invention, there are two compression formats and an uncompressed format available. The two compression formats comprise a first format that stores the tile in a single cache line and the second format stores the tile in two cache lines. If the tile cannot be stored in two cache lines, it must be stored uncompressed.

Using two bit entries, four states of tile compression status can be represented. In the invention, 00 represents a cleared state, 01 represents the single cache line compression scheme, 10 represents the two cache line compression scheme, and 11 represents uncompressed data. Some of the conditions where the schemes are used are illustrated below in Table 1.

TABLE 1

| Bits per Sample | Z bits | Stencil Bits | Sample Count | TFT00 | TFT 01 | TFT 10 | TFT 11 |
|---|---|---|---|---|---|---|---|
| 16 | 16 | 0 | 1 | cleared | unused | unused | 1 line |
| 16 | 16 | 0 | 2 | cleared | comp1lines_16x2 | comp2lines_16x2 | 2 lines |
| 16 | 16 | 0 | 3 | cleared | comp1lines_16x3 | comp2lines_16x3 | 3 lines |
| 16 | 16 | 0 | 4 | cleared | comp1lines_16x4 | comp2lines_16x4 | 4 lines |
| 16 | 16 | 0 | 6 | cleared | comp1lines_16x6 | comp2lines_16x6 | 6 lines |
| 32 | 24 | 8 | 1 | cleared | comp1lines_32x1 | comp2lines_32x1 | 2 lines |
| 32 | 24 | 8 | 2 | cleared | comp1lines_32x2 | comp2lines_32x2 | 4 lines |
| 32 | 24 | 8 | 3 | cleared | comp1lines_32x3 | comp2lines_32x3 | 6 lines |
| 32 | 24 | 8 | 4 | cleared | comp1lines_32x4 | comp2lines_32x4 | 8 lines |
| 32 | 24 | 8 | 6 | cleared | comp1lines_32x6 | comp2lines_32x6 | 12 lines |

The number of Z bits, the visible depth complexity, and the number of samples determine the level of compression that can be used. The entries labled TFT00, TFT01, TFT10, and TFT11 indicates the compression scheme that is used and the entries indicate how many cache lines are needed to store the plane equation data. TFT 01 is the highest level of compression since only a single cache line is used, TFT 10 is a lower level of compression since two cache lines are used, and TFT 11 is no compression at all. TFT 11 shows the number of cache lines that are required when there is no compression.

Referring to the table, for instance, the first entry shows 16 Z bits and a sample count of 1. With no compression, at all (TFT of 11), one cache line will be used. Since neither compression scheme can result in less than a single cache line, compression is unused in this case, as is shown by the table entries for TFT 01 and TFT 10. The TFT 10 compression scheme results in two cache lines per tile and the TFT 01 scheme results in one cache line per tile. Referring to the last entry in the table 1 with 32 bits per sample and a sample count of 6, 12 cache lines would be required with no compression, while the TFT 10 compression scheme gives a 6:1 compression (only two cache lines are used) and the TFT 01 compression scheme gives a 12:1 compression ratio with a single cache line used instead of the 12 cache lines in the uncompressed mode.

It can be seen then that the present invention can be used in a multisampling environment and provides additional compression advantages when the sample size of each pixel increases. The same number of plane equations is used whether the sample size per pixel is 1, 2, 3, 4, or 6 samples. Thus the invention provides advantages during multisampling. For example, if four plane equations results in 2× compression for single sampled data, then for four samples per pixel, there is 8× compression (eight cache lines would be needed for uncompressed mode) and for six samples, there is 12× compression, as shown above.

Tile Format Table (TFT)

The compression status of each tile could be stored in the tile itself. However, an uncompressed tile has no available space to indicate its status as an uncompressed tile. In addition, at least the first word of each tile would need to be read to determine if it is compressed or not, reducing memory efficiency because reading the first word of a tile before making a decision about how many memory words to read would make typical pipelined memory access difficult. To avoid these problems, the present invention includes a means of tracking the compression status of each tile via a Tile Format Table (TFT). The TFT includes an entry for each tile. This is why the compression states described above were referred to as, for example, TFT 01. When the tile is written to memory, its corresponding TFT entry is updated to indicate whether it is compressed or not and which of the compression schemes 01, 10, or 11, was used.

Because the number of tiles in a typical image can be large, such as 64K 4×4 tiles in a 2M pixel image, even with only a few compression states stored in the TFT, the TFT memory can be significant, (as much as 4K bytes). The TFT itself can be cached in the graphics processor and maintained in memory to reduce on chip TFT storage. In this case a graphics memory access can update the TFT cache entry from the memory TFT if the tile entry it requires is not in the cache. Updating the TFT cache can be pipelined with graphics processor compression and decompression in conjunction with pipelined memory access. Typically the TFT cache entries are updated on memory read and therefore available for the later memory write of the same tiles. A memory TFT with graphics processor cache also simplifies providing access to the TFT by other system elements, insofar as the memory TFT is accessible by other system elements.

Figure 4:
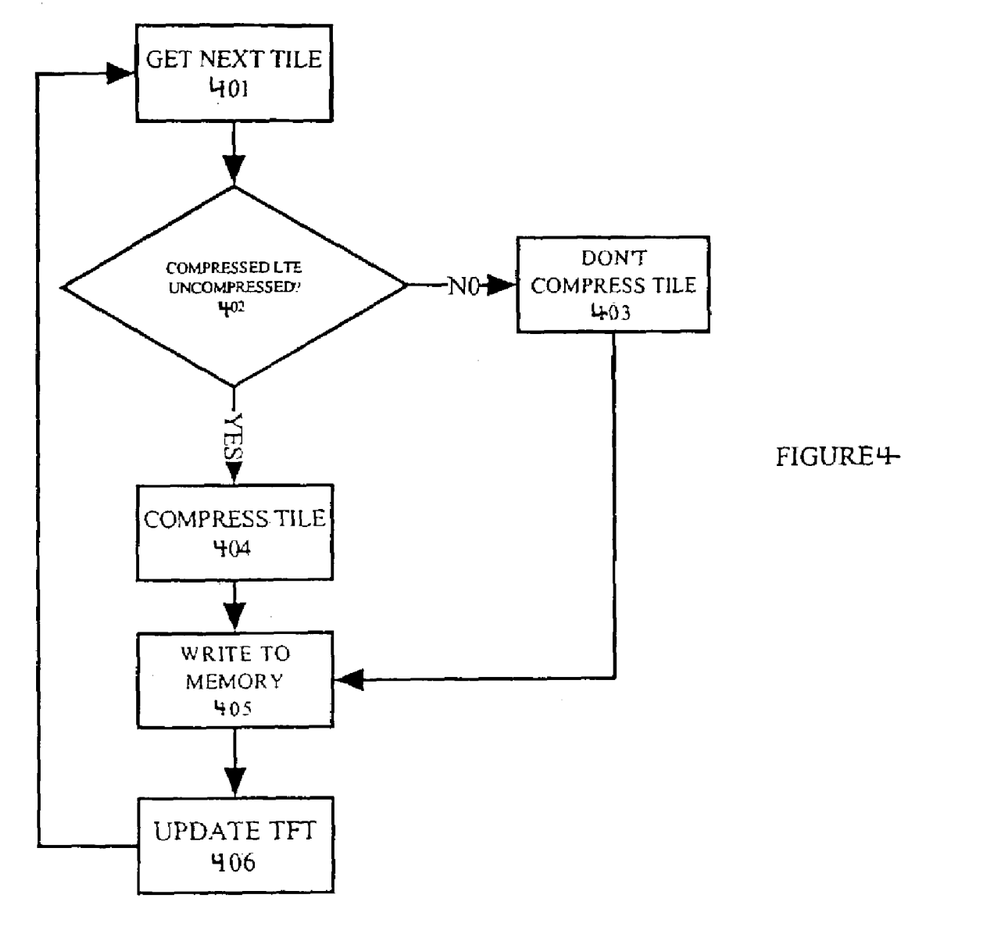
FIG. 4 is a flow diagram illustrating the compression of tiles and updating of a TFT in the present invention.

A flow diagram of the compression of tiles and updating of the TFT in the present invention is illustrated in FIG. 4. At step 401 the graphics processor gets the next tile to be written to memory. At step 402 it is determined if after compression the compressed tile will be less than or equal to the uncompressed tile (i.e. the original tile). If not, the tile remains uncompressed at step 403. If the compressed tile would be less than or equal to the uncompressed tile the tile is compressed at step 404 using one of the variable compression schemes contemplated by the present invention. After either step 403 or 404, the tile is written to memory at step 405. At step 406, the appropriate entry in the TFT is updated to indicate the compressed/uncompressed status of the tile. The system then returns to step 401.

High Compression Scheme

Figure 6A:
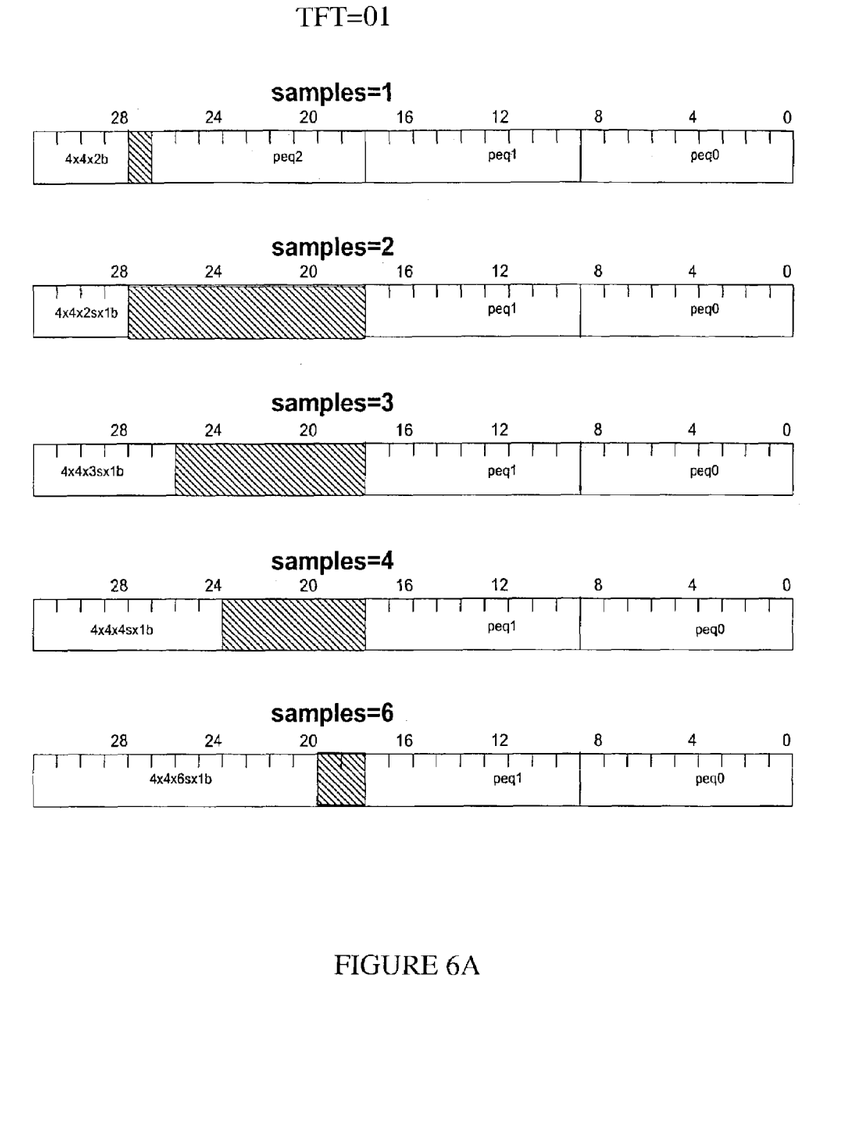
FIGS. 6A and 6B illustrate the high and low compression scheme data structures of the present invention.

FIG. 6A shows several data structures for the fields of the TFT 01 compression mode for unsampled and for different multisample values. The TFT 01 compression scheme is a high compression scheme because the entire tile is stored in a single cache line. The beginning of each data structure includes two bit pointers that indicates, for each pixel or pixel sample, the appropriate plane equation used to describe the sample. A tile is 4×4 pixels so for each tile there are 16 indexes per tile to indicate which plane equation is used when there is no multisampling. Each additional sample requires an additional 16 two bit pointers. This means that with more samples, fewer plane equations can fit into a cache line. As seen in FIG. 6A, the data structure for the unsampled case allows three plane equations in the cache line. For multisample situations of 2, 3, 4, and 6 samples per pixel, the size of the field needed to store the pointers means that only two plane equations can be stored in the cache line.

After the pointers in the data structure for this high compression scheme are the plane equations (peq0, peq1, and peq2 for the unsampled case, peq0 and peq1 for all others). Thus, in a multisampling situation, the high compression scheme can only be used when the visible depth complexity is no more than two, in other words, when only two visible primitives intersect the tile. In a single sample environment, a visible depth complexity of up to three can be described in the high compression scheme. If there are too many visible primitives, the low compression scheme or the uncompressed scheme must be used.

Low Compression Scheme

Figure 6B:
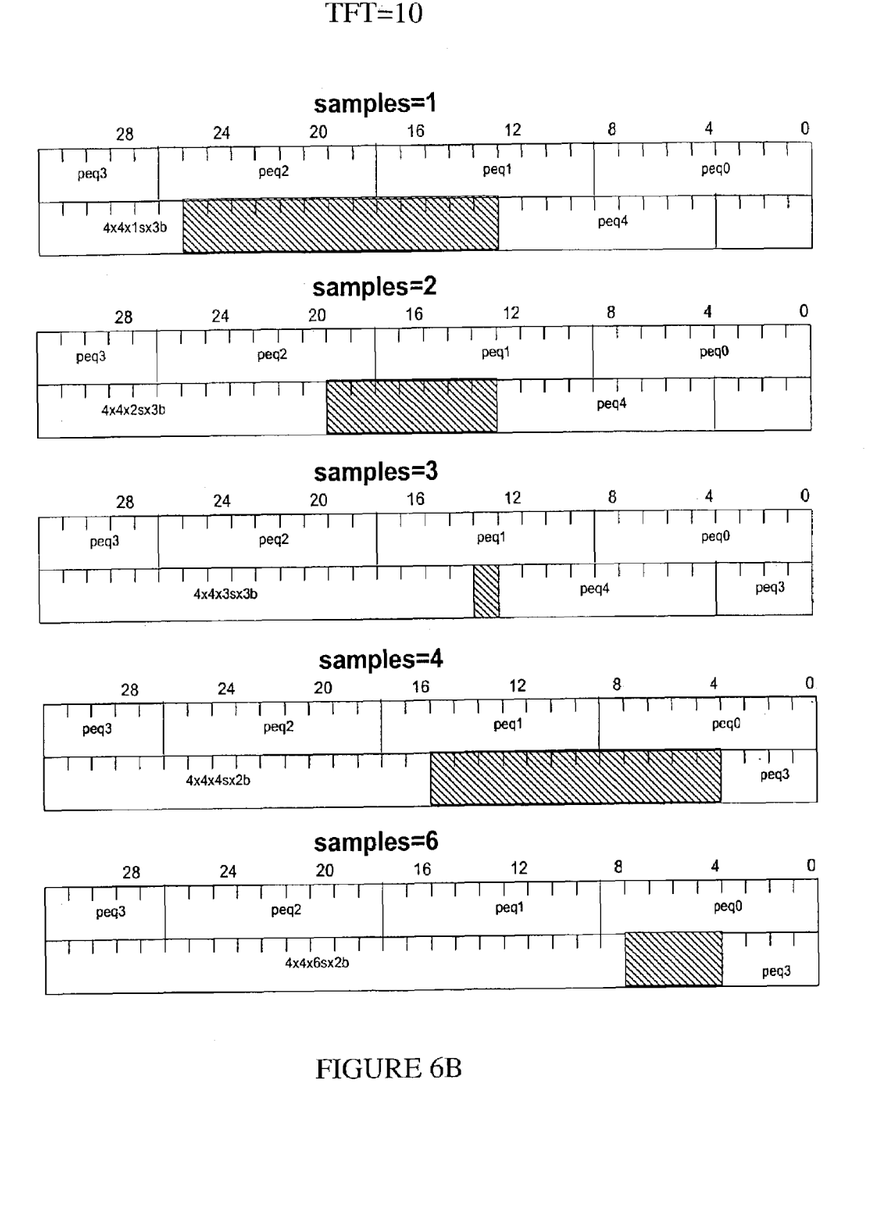

FIG. 6B illustrates the data structures of the low compression scheme where TFT is 10 and each tile is stored in two cache lines. Each of these structures is comprised of two cache lines. The first cache line in each pair comprises plane equations peq0, peq1, peq2, and part of peq3. The second cache line comprises the remainder of peq3 and for samples 1, 2, and 3, an additional plane equation peq4 and the pointer field. The 4 and 6 sample data structure requires so much space for the pointer field that there is no room for peq4 and only three plane equations are possible.

It can be seen that the low compression scheme is used when the visible depth complexity is 3 or 4, depending on the number of samples per pixel.

It should be noted that the data structures of FIGS. 6A and 6B are given by way of example only, and that other data structures and plane equation formats could be used without departing from the scope of the present invention.

Compression Operation

Figure 3:
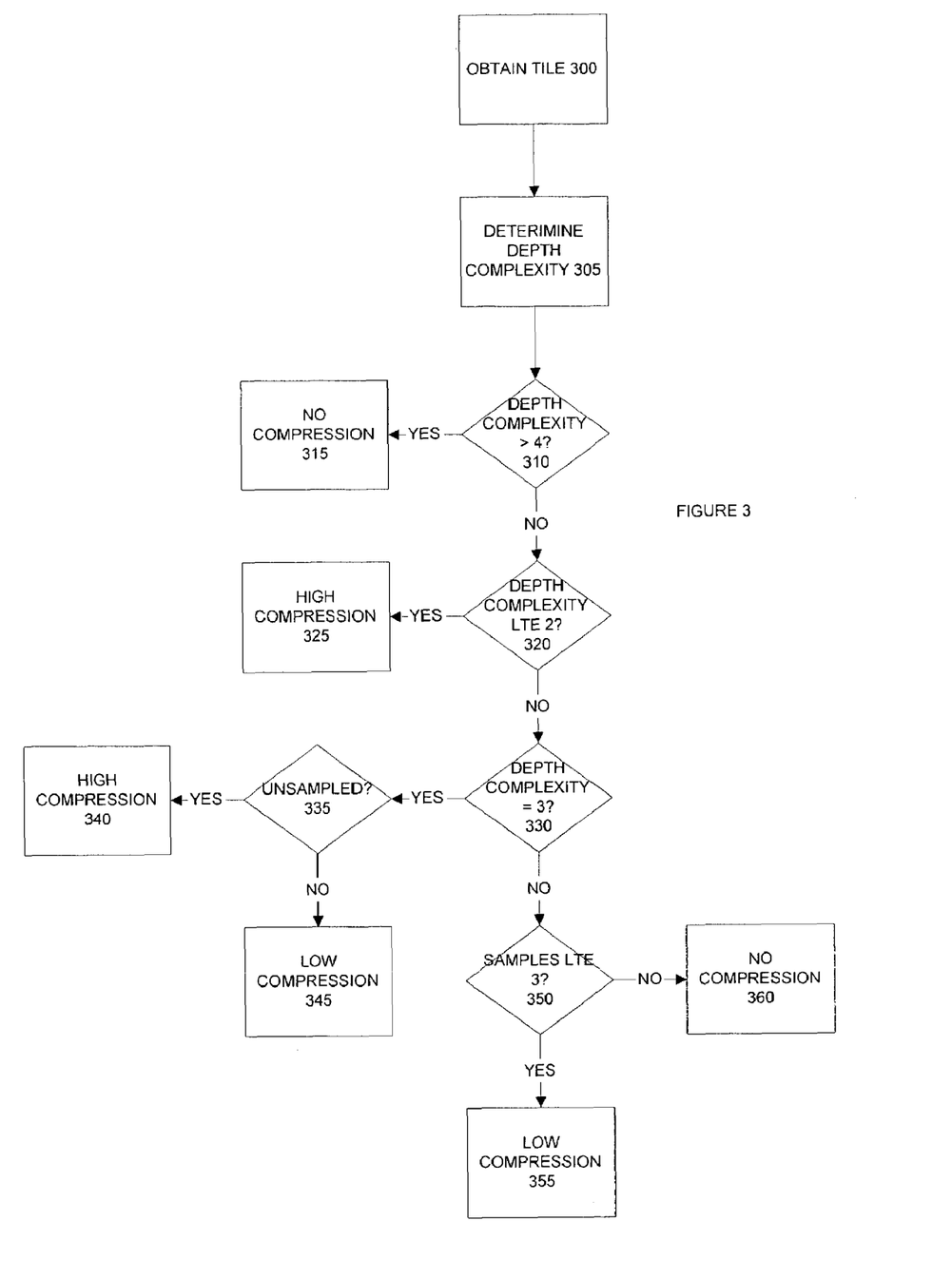
FIG. 3 shows Z compression according to another embodiment of the present invention.

Compression operation using the plane equation scheme of the present invention is illustrated in FIG. 3. At step 300, a tile is obtained and examined. At step 305 the pixels are examined one at a time. Each pixel comes with a plane equation so at this point, it is assumed that the current plane equation of the first pixel is peq0. Each pixel is retrieved and is examined to see if it has a different plane equation than any plane equations that have currently been identified. If there is a different plane equation a Z test is performed on the pixel to see if it is visible. If it is visible then the depth complexity is increased. If it is not visible, then the depth complexity remains whatever it was based on the prior pixels. After all pixels have been examined it is known which pixels are visible and the depth complexity of the tile (i.e. how many plane equations are needed to describe the tile).

At decision block 310 it is determined if the depth complexity is greater than 4. If yes, there is no compression and the tile is stored uncompressed at block 315. If no, then at decision block 320 it is determined if the depth complexity is less than or equal to 2. If so, then the high compression scheme is used at block 325 and the TFT table is set to 10.

If the decision at block 320 is no, then at decision block 330 it is determined if the depth complexity is equal to 3. If so, then it is next determined if the data is unsampled at decision block 335. If yes, then the high compression scheme can be used at block 340. If not, then the low compression scheme must be used at block 345.

If the decision at block 330 is no, then the depth complexity must be 4 based on the prior tests. Now it is required to know the number of samples per pixel to know if the low compression scheme can be used. At decision block 350 if the number of samples is less than or equal to 3, the low compression scheme can be used at block 355. If not, then the tile must be uncompressed at block 360.

Compression and Decompression During Memory Operations

Figure 5:
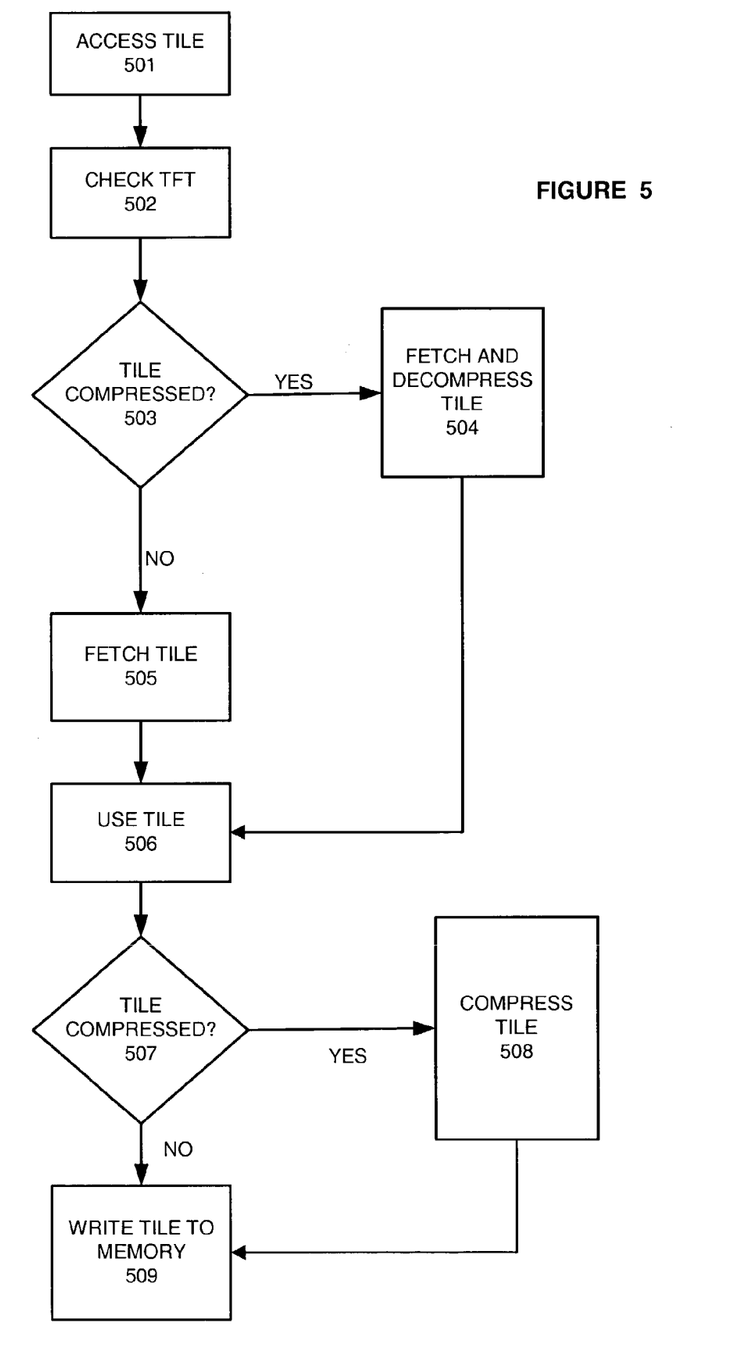
FIG. 5 is a flow diagram illustrating the reading of a tile from memory and the writing back of a tile to memory.

In one embodiment, a tile may be decompressed into Z pixel data when the tile is read from memory for graphics processing and is compressed when written back to memory. FIG. 5 is a flow diagram illustrating the reading of a tile from memory and the writing back of a tile to memory. At step 501 the tile is accessed from memory. At step 502 the TFT entry for that tile is examined. At step 503 it is determined if the TFT entry indicates a compressed tile. If so, the tile is fetched and decompressed at step 504. If not, the tile is simply fetched at step 505. After either step 504 or 505, the tile is used by the graphics processor at step 506. When writing a tile back to memory, the TFT is again checked at step 507 to see if the tile was a compressed tile. If so, the tile is compressed at step 508. After step 508, or if the tile was not a compressed tile, it is written back to memory at step 509.

In another embodiment, the cache architecture itself is based on the compressed Z format and tiles need not be uncompressed when being read from cache.

TFT Structure

The present invention contemplates the ability to apply different levels of compression to each tile. If the number of plane equations required by a tile is less than the maximum number of plane equations, then the tile can be stored compressed.

Other system elements, such as a CPU or I/O controller, which access the compressed images generated by the graphics processor, need to perform decompression and optionally compression. This means that the TFT is a shared system resource. The TFT can act as a shared resource by being multibuffered much like color images are multibuffered, that is, one copy of the TFT accessed by the graphics processor during rendering one image, and another copy of the TFT accessed by other system elements for another image.

Tile Caching

In a typical implementation, the graphics processor, anticipates image tiles that it will process, reads memory words in advance of processing (prefetch), and buffers memory tiles it has completed processing in advance of writing memory words. This pipelining of memory reads, graphics processing, and memory writes allows enough computing time to perform compression and decompression of the present invention in parallel with other processing. One implementation of pipelined memory access and graphics processing is an image cache, in which tiles are cache lines which are read from memory on cache line misses and written to memory on cache line evictions.

Stencil Buffer Data

Column 2 of Table 1 shows the use of stencil buffer data in the form of stencil bits. A stencil bit corresponds to a state in a stencil buffer. A stencil buffer is a non-visual frame buffer comprising a logical bit field that is used to mask certain screen regions. For instance, a stencil buffer is often used for shadowing in a multi pass rendering algorithm where the screen color is produced in stages. Certain shadowed screen regions might change color differently and should be stenciled out in certain passes. The stencil bit in column 2 is used in this embodiment as a ninth byte concatenated to the 8 byte plane equations.

Figure 7:
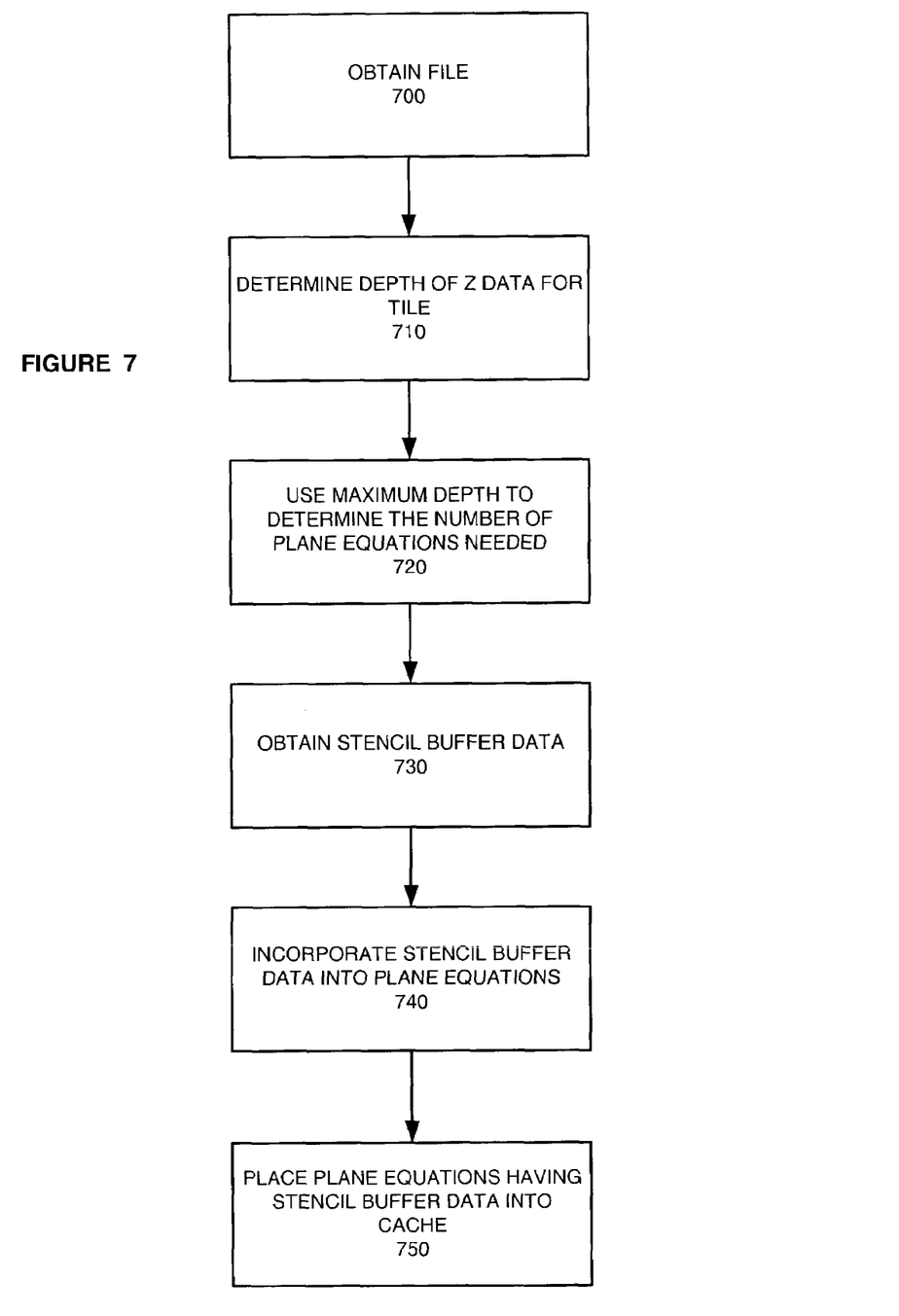
FIG. 7 illustrates Z compression using a variable compression mode and stencil buffer data according to an embodiment of the present invention.

FIG. 7 is a flowchart showing the operation of one embodiment of the present invention where a variable compression mode is used in conjunction with storing stencil buffer data. At step 700, a tile is obtained. The tile may be a 4×4 grouping of pixels, or it may be another suitable configuration. At step 710, the depth of the Z data pixels in the tile are determined. At step 720, the maximum depth is used to determine the number of plane equations required to store the tile. At step 730, stencil buffer data for the tile is obtained. At step 740, the stencil buffer data is incorporated into the plane equations. Then, at step 750, the plane equations having stencil buffer data are placed into the cache.

The advantage of the invention is that bandwidth improvement for existing applications is achieved and performance is never worse than an uncompressed Zbuffer. Furthermore, there is a synergy between compressed Z and Z caches in that areas of high geometric complexity (small polygons) benefit from the multiple hit write combining performance of the Z cache even if tiles don't compress, and areas of low geometric complexity (big polygons) compress well even if cache line pixels are only written once per miss and eviction. Because the compression is based on pixel masks, functions like alpha threshholding and virtual intersections can also be compressed. A secondary advantage of Z compression is that translucent pixels that test but don't update Z do not decrease the amount of Z compression, so effects like particles, smoke, shadows, weapons flares, etc. which blend on top of opaque Z buffers can have unlimited geometric pixel complexity without increasing Z bandwidth.

The above-described compression schemes are described in conjunction with an overall system for compressing and decompressing data in a graphics system. One such system is described in further detail in co-pending U.S. patent application entitled "Method and Apparatus for Compression and Decompression of Z data" application Ser. No. 09/653,055, filed on Sep. 1, 2000, assigned to the assignee of the present application, and hereby fully incorporated into the present application by reference Thus, compression and decompression of Z data using a variable compression mode is described in conjunction with one or more specific embodiments. The invention is defined by the claims and their full scope of equivalents.

We claim:

1. A method of compressing data in a graphics processing system comprising:
   obtaining a data tile;
   determining a visible depth complexity of said tile, wherein each level of depth complexity is represented by a plane equation and multiple plane equations are stored in a cache line;
   selecting a compression scheme based on said depth complexity, wherein said selected compression scheme comprises one of a high compression scheme and a low compression scheme and wherein up to three plane equations are stored in a cache line in said high compression scheme;
   storing said tile using said selected compression scheme.

2. The method of claim 1 wherein no compression is selected if said depth complexity exceeds a threshold.

3. The method of claim 1 wherein said tiles comprise a 4×4 block of pixels.

4. The method of claim 3 wherein said pixels represent Z data.

5. The method of claim 1 wherein said plane equation includes one or more bits of stencil data.

6. The method of claim 1 wherein up to four plane equations are stored in two cache lines in said low compression scheme.

7. The method of claim 1 wherein cache lines include a matrix identifying which plane equation is associated with each pixel of said tile.

8. The method of claim 1 wherein said tile comprises multisampled pixel data.

9. A computer program product comprising:
   a computer usable medium having computer readable program code embodied therein configured for compressing data in a graphics processing system, said computer program product comprising:
   computer readable code configured to cause a computer to obtain a data tile;
   computer readable code configured to cause a computer determine a visible depth complexity of said tile, wherein each level of depth complexity is represented by a plane equation and multiple plane equations are stored in a cache line;
   computer readable code configured to cause a computer to select a compression scheme based on said depth complexity, wherein said selected compression scheme comprises one of a high compression scheme and a low compression scheme and wherein up to three plane equations are stored in a single cache line in said high compression scheme;
   computer readable code configured to cause a computer to store said tile using said selected compression scheme.

10. The computer program product of claim 9 wherein said computer program product causes said computer to select no compression scheme if said depth complexity exceeds a threshold.

11. The computer program product of claim 9 wherein said tiles comprise a 4×4 block of pixels.

12. The computer program product of claim 11 wherein said pixels represent Z data.

13. The computer program product of claim 9 wherein said plane equation includes one or more bits of stencil data.

14. The computer program product of claim 9 wherein up to four plane equations are stored in two cache lines in said low compression scheme.

15. The computer program product of claim 9 wherein cache lines include a matrix identifying which plane equation is associated with each pixel of said tile.

16. The computer program product of claim 9 wherein said tile comprises multisampled pixel data.

17. A computer program product comprising:
   a computer usable medium having computer readable program code embodied therein configured for compressing data in a graphics processing system, said computer program product comprising:
   computer readable code configured to cause a computer to obtain a data tile;
   computer readable code configured to cause a computer determine a visible depth complexity of said tile, wherein each level of said depth complexity is represented by a plane equation; and said plane equation is stored in a cache line and up to three plane equations are stored in a single cache line in a high compression scheme;

computer readable code configured to cause a computer to select a compression scheme based on said depth complexity;

computer readable code configured to cause a computer to store said tile using said selected compression scheme;

wherein cache lines include a matrix identifying which plane equation is associated with each pixel of said tile.

18. The computer program product of claim 17 wherein said computer program product causes said computer to select no compression scheme if said depth complexity exceeds a threshold.

19. The computer program product of claim 17 wherein said selected compression scheme comprises one of a high compression scheme and a low compression scheme.

20. The computer program product of claim 17 wherein said tiles comprise a 4×4 block of pixels.

21. The computer program product of claim 20 wherein said pixels represent Z data.

22. The computer program product of claim 17 wherein said plane equation includes one or more bits of stencil data.

23. The computer program product of claim 17 wherein up to four plane equations are stored in two cache lines in said low compression scheme.

24. The computer program product of claim 17 wherein said tile comprises multisampled pixel data.

* * * * *